US012724176B2

(12) United States Patent
Henault et al.

(10) Patent No.: US 12,724,176 B2
(45) Date of Patent: Sep. 1, 2026

(54) SYSTEM FOR INSPECTING SURFACES OF AN OPTICAL WAVE USING A GRADIENT DENSITY FILTER

(71) Applicants: CENTRE NATIONAL DE LA RECHERCHE SCIENTIFIQUE, Paris (FR); OBSERVATOIRE DE LA COTE D'AZUR, Nice (FR); UNIVERSITÉ CÔTE D'AZUR, Nice Cedex (FR); UNIVERSITÉ GRENOBLE ALPES, Saint-Martin-d'Heres (FR)

(72) Inventors: François Henault, Grenoble (FR); Alain Spang, Vence (FR)

(73) Assignees: CENTRE NATIONAL DE LA RECHERCHE SCIENTIFIQUE, Paris (FR); OBSERVATOIRE DE LA COTE D'AZUR, Nice (FR); UNIVERSITÉ CÔTE D'AZUR, Nice (FR); UNIVERSITE GRENOBLE ALPES, Saint-Martin-d'Heres (FR)

( * ) Notice: Subject to any disclaimer, the term of this patent is extended or adjusted under 35 U.S.C. 154(b) by 237 days.

(21) Appl. No.: 18/018,520

(22) PCT Filed: Jul. 30, 2020

(86) PCT No.: PCT/FR2020/051404

§ 371 (c)(1),
(2) Date: Jan. 27, 2023

(87) PCT Pub. No.: WO2022/023619

PCT Pub. Date: Feb. 3, 2022

(65) Prior Publication Data

US 2023/0296813 A1 Sep. 21, 2023

(51) Int. Cl.
*G02B 3/00* (2006.01)
*G01J 9/00* (2006.01)
*G02B 5/20* (2006.01)

(52) U.S. Cl.
CPC .............. *G02B 3/0056* (2013.01); *G01J 9/00* (2013.01); *G02B 5/20* (2013.01); *G02B 2003/0093* (2013.01)

(58) Field of Classification Search
None
See application file for complete search history.

(56) References Cited

FOREIGN PATENT DOCUMENTS

FR 2 907 214 A1 4/2008

OTHER PUBLICATIONS

Henault (François Hénault, "Fresnel diffraction analysis of Ronchi and reverse Hartmann tests," J. Opt. Soc. Am. A 35, 1717-1729 (2018)) (Year: 2018).*

(Continued)

*Primary Examiner* — Kara E. Geisel
*Assistant Examiner* — Chad Andrew Reverman
(74) *Attorney, Agent, or Firm* — Maier & Maier, PLLC

(57) ABSTRACT

The systems for inspecting an optical wave surface output from an optical device, the optical device comprising an output pupil, the inspection system comprising an optical measurement head and a computer for processing the images obtained from said the optical measurement head. The optical measurement head comprises: a density gradient filter, the density varying periodically in the two directions of the space, a matrix array comprising at least four identical lenses, of square form, of the same focal length and disposed symmetrically, a matrix of photodetectors, each of the four lenses forming, of the pupil, an image in the plane of this (Continued)

matrix. The computer for processing the images comprises computation means that make it possible to calculate the partial derivatives $$\frac{\partial \Delta}{\partial x}(x, y) \text{ and } \frac{\partial \Delta}{\partial y}(x, y)$$

of the wave surface Δ(x, y) in the plane of the output pupil.

5 Claims, 5 Drawing Sheets

(56) References Cited

OTHER PUBLICATIONS

Akondi (Akondi V, Dubra A. Shack-Hartmann wavefront sensor optical dynamic range. Opt Express. Mar. 15, 2021;29(6):8417-8429. doi: 10.1364/OE.419311. PMID: 33820289; PMCID: PMC8237929). (Year: 2021).*

Pulaski ("Lenslet arrays measure aberrations in like devices," Paul D. Pulaski, Laser Focus World, Dec. 1, 2002, https://www.laserfocusworld.com/test-measurement/test-measurement/article/16552323/lenslet-arrays-measure-aberrations-in-like-devices). (Year: 2002).*

Malacara, "Optical Shop Testing", Third Edition, Willey 2007.

Hardy, et al., "Real-time atmospheric compensation", J. Opt. Soc. Am., vol. 67, No. 3, pp. 360-369, 1977.

Shack, et al., "Production and use of a lenticular Hartmann screen", J. Opt. Soc. Am., vol. 61, p. 656, 1971.

Primot, et al., "Extended Hartmann test based on the pseudoguiding property of a Hartmann mask completed by a phase chessboard", Applied Optics, vol. 39, pp. 5715-5720, 2000.

Liang, et al., "Objective measurement of wave aberrations of the humane eye with the use of a Hartmann-Shack wave-front sensor", J. Opt. Soc. Am. A, vol. 11, No. 7, pp. 1949-1957, 1994.

Roddier, et al., "Wavefront reconstruction using iterative Fourier transforms", Applied Optics, vol. 30, No. 11, pp. 1325-1327, 1991.

Henault, "Fresnel diffraction analysis of Ronchi and reverse Hartmann tests", Journal of the Optical Society of America A, vol. 35, Issue 10, pp. 1717-1729, 2018.

Henault, et al., "Crossed-sine wavefront sensor for adaptive optics, metrology and ophthalmology applications", Engineering Research Express, vol. 2, No. 1, 2020.

Henault, et al., "Crossed-cosine intensity filter for coronagraphy and low-order wavefront sensing", Optical Engineering, vol. 48, Issue 7, 2009.

Henault, et al., "Wavefront sensor based on varying transmission filters: theory and expected performance", Journal of Modern Optics, vol. 52, Issue 14, pp. 1917-1931, 2005.

* cited by examiner

SYSTEM FOR INSPECTING SURFACES OF AN OPTICAL WAVE USING A GRADIENT DENSITY FILTER

CROSS-REFERENCE TO RELATED APPLICATION

This application is a National Stage of International patent application PCT/FR2020/051404, filed on Jul. 30, 2020, the disclosure of which is incorporated by reference in its entirety.

FIELD OF THE INVENTION

The technical field of the invention is that of the measurement and inspection of optical wave surfaces. A great number of technical fields require the inspection of wave surfaces. More particularly, but not exhaustively, quality inspection of optical surfaces or of optical systems, inspection of adaptive optics used in fields ranging from astronomy to ophthalmology will be cited.

BACKGROUND

The quality inspection of optical surfaces is an extremely wide field which includes the metrology of individual optical components, the alignment of complex optical systems, or the assessment of laser beam quality. It covers the visible, infrared and ultraviolet spectral ranges. The measurement devices used currently are interferometers which call for the development of imposing systems, or of wavefront sensors that are more compact but of lesser precision and of lower resolution. Additional information on this point can be found in the work by D. Malacara entitled "Optical Shop Testing", Third Edition, Willey 2007.

The large telescopes used for astronomy comprise adaptive optical systems which require wavefront sensors. These systems are not necessarily well suited to the observation of extensive objects such as galaxies or globular clusters. Moreover, these systems can include artificial stars obtained from laser beams. In this case, the adaptive optical systems are necessarily complex insofar as they comprise as many wavefront sensors as artificial stars. Other information on this subject will be found in the following publications:

J. W. Hardy, J. E. Lefebvre, C. L. Kolioupoulos, entitled "Real-time atmospheric compensation" J. Opt. Soc. Am. vol. 67, p. 360-369 (1977), R. V. Shack, B. C. Platt, entitled "Production and use of a lenticular Hartmann screen" J. Opt. Soc. Am. vol. 61, p. 656 (1971), J. Primot, N. Guerineau, entitled "Extended Hartmann test based on the pseudoguiding property of a Hartmann mask completed by a phase chessboard", published in Applied Optics vol. 39, p. 5715-5720 (2000).

In ophthalmology, adaptive optical systems are also used that are based on the use of spot laser sources which can pose other problems of use. Other information on this subject will be found in the publication by J. Lang, B. Grimm, S. Goelz, J. F. Bille, entitled "Objective measurement of wave aberrations of the humane eye with the use of a Hartmann-Shack wave-front sensor", published in J. Opt. Soc. Am. A, vol. 11, p. 1949-2685 (1994).

SUMMARY OF THE INVENTION

The system for inspecting optical wave surfaces according to the invention does not present the above drawbacks.

It comprises an optical head which comprises only optical elements that are simple to produce and image processing. More specifically, the subject of the invention is a system for inspecting an optical wave surface output from an optical device, said optical device comprising an output lens, said inspection system comprising an optical measurement head and a computer for processing the images obtained from said optical measurement head, characterized in that the optical measurement head comprises:

a density gradient filter, in a plane referenced (x', y') at right angles to the optical axis of the optical measurement head, the transmission T(x', y') of said filter being governed by the equation:

$$T(x', y') = \frac{1 + \sin\left(\sqrt{2}\,\pi(x' - y')/p_x\right)\sin\left(\sqrt{2}\,\pi(x', y')/p_y\right)}{2} \tag{1}$$

$p_x$ and $p_y$ representing the periods of the two sinusoidal functions dependent respectively on (x'−y') and (x'+y').

a matrix array of identical lenses, of square form, of the same focal length, said matrix array comprising at least four lenses, each center of one of the four lenses being disposed on an axis passing through the center of the output pupil and a point O'M'(i, j) of the density gradient filter such that, in the plane referenced (x', y'), $$O'M'_{i,j} = \begin{bmatrix} i(m + 0.25)p_x \big/ \sqrt{2} \\ j(n + 0.25)p_y \big/ \sqrt{2} \end{bmatrix} \tag{2}$$

i and j being able to take the values −1 and +1, m and n being positive integers or nil.

a matrix of photodetectors, each of the four lenses forming, of the pupil, an image in the plane of this matrix, these images being referenced $I''_k(x, y)$, k varying from 1 to 4;

the computer for processing the images comprises computation means that make it possible to calculate the partial derivatives $$\frac{\partial \Delta}{\partial x}(x, y) \text{ and } \frac{\partial \Delta}{\partial y}(x, y)$$

of the wave surface Δ(x, y) in the plane of the output pupil, these partial derivatives being equal to $$\frac{\partial \Delta}{\partial x}(x, y) = Ax + B\sin^{-1}\left(\frac{I''_4(x, y) - I''_3(x, y) + I''_2(x, y) - I''_1(x, y)}{C}\right) \tag{3}$$

$$\frac{\partial \Delta}{\partial y}(x, y) = Ay + B\sin^{-1}\left(\frac{I''_4(x, y) + I''_3(x, y) - I''_2(x, y) - I''_1(x, y)}{C}\right) \tag{4}$$

A, B and C being constants dependent on the geometrical parameters of the optical measurement head.

Advantageously, when the optical device is a lens, its focusing plane is situated in the plane of the matrix array of the lenses.

Advantageously, when the optical device is an afocal, the optical measurement head comprises an additional optic disposed in the output pupil, such that the focusing plane of said additional optic is situated in the plane of the matrix array of the lenses.

Advantageously, the matrix array comprises at least one second quadruplet of lenses.

Advantageously, the two periods $p_x$ and $p_y$ are equal.

An alternative embodiment of the invention relates to a system for inspecting an optical wave surface output from an optical device, said optical device comprising an output pupil, said inspection system comprising an optical measurement head and a computer for processing the images obtained from said optical measurement head, characterized in that the optical measurement head comprises:

a density gradient filter, in a plane referenced (x', y') at right angles to the optical axis of the optical measurement head, the transmission T(x', y') of said filter being governed by the equation:

$$T_{ij}(x', y') = \frac{1 + \sqrt{2}\pi(idx'/p_x - jdy'/p_x)}{2} \tag{5}$$

$$\text{with } \begin{bmatrix} dx' \\ dy' \end{bmatrix} = \begin{bmatrix} x' - i(m + 0.25)p_x/\sqrt{2} \\ y' - j(n + 0.25)p_y/\sqrt{2} \end{bmatrix} \tag{6}$$

$p_x$ and $p_y$ representing the periods of the two sinusoidal functions dependent respectively on dx' and dy', i and j being able to take the values −1 and +1, m and n being positive integers or nil, a matrix array of identical lenses, of square form, of the same focal length, said matrix array comprising at least four lenses, each center of one of the four lenses being disposed on an axis passing through the center of the output pupil and a point O'M'(i, j) of the density gradient filter such that, in the plane referenced (x', y'), $$O'M'_{i,j} = \begin{bmatrix} i(m + 0.25)p_x/\sqrt{2} \\ j(n + 0.25)p_y/\sqrt{2} \end{bmatrix} \tag{7}$$

a matrix of photodetectors, each of the four lenses forming, of the pupil, an image in the plane of this matrix, these images being referenced I"k(x, y), k varying from 1 to 4;

the computer for processing the images comprises computation means that make it possible to calculate the partial derivatives $$\frac{\partial \Delta}{\partial x}(x, y) \text{ and } \frac{\partial \Delta}{\partial y}(x, y)$$

of the wave surface Δ(x, y) in the plane (x, y) of the output pupil, these partial derivatives being equal to:

$$\frac{\partial \Delta}{\partial x}(x, y) = Ax + B(I_4''(x, y) - I_3''(x, y) + I_2''(x, y) - I_1''(x, y)) \tag{8}$$

$$\frac{\partial \Delta}{\partial y}(x, y) = Ay + B(I_4''(x, y) + I_3''(x, y) - I_2''(x, y) - I_1''(x, y)) \tag{9}$$

A and B being constants dependent on the geometrical parameters of the optical measurement head.

BRIEF DESCRIPTION OF THE DRAWINGS

The invention will be better understood and other advantages will become apparent on reading the following description given in a nonlimiting manner and from the attached figures in which.

DETAILED DESCRIPTION

Figure 1:
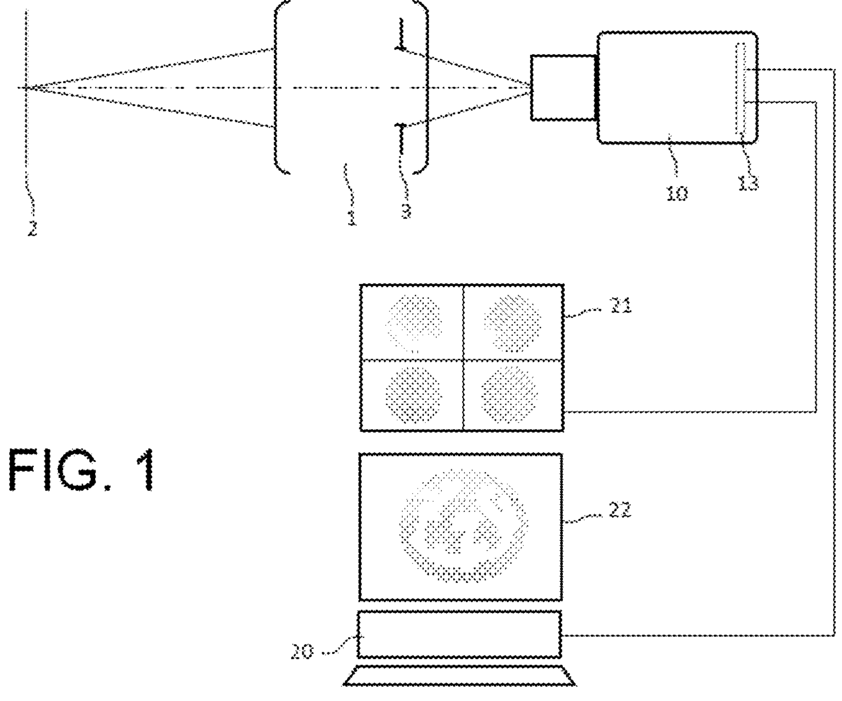
FIG. 1 represents an overview of the inspection system according to the invention.

The general block diagram of the system for inspecting optical wave surfaces according to the invention is represented in FIG. 1. It essentially comprises an optical head 10 and an image processing computer 20. The optical head comprises a matrix of photodetectors 13. The latter is linked to a first viewing device 21 which displays the images obtained from the matrix of photodetectors. Likewise, the image processing computer comprises a second viewing device 22 that makes it possible to display, among other things, the processed images and the information necessary to the processing.

This system is intended to inspect an optical device 1. The latter forms, of a light object 2 or of a light source, a light image. When the optical device is a lens, this image is real. When the device is an afocal system, the image is at infinity. As will be seen hereinafter in the description, the inspection system according to the invention is capable of inspecting these two types of optical devices. In the case of FIG. 1, the optical device is a lens.

The optical device 1 comprises a pupil 3. The object of the inspection system is to measure the wave surface of the light image given by the optical device on this pupil. The pupil is generally of circular form. It can include a central closure and its possible support.

Figure 2:
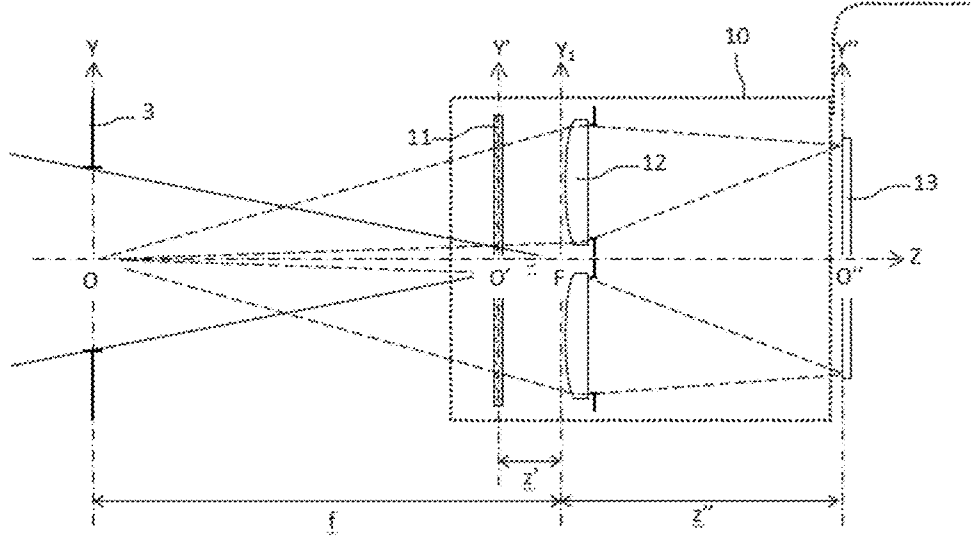
FIG. 2 represents the optical measurement head of an inspection system according to a first embodiment of the invention.

The optical head according to the invention is represented in FIG. 2. It essentially comprises a density gradient filter 11, a matrix array of lenses 12 and the matrix 13 of photodetectors as previously indicated.

In order to determine the respective positions of these various elements, the following conventions have been adopted.

OXYZ denotes the reference frame attached to the pupil of the optical device. Point O corresponds to the center of the pupil and OZ is the optical axis of the optical device. The axis X is at right angles to the plane of FIG. 2. The points P of the pupil situated in the plane OXY are designated by their cartesian coordinates (x, y). In this reference frame, the wave surface to be measured is denoted Δ(x, y).

f denotes the distance which separates the plane of the pupil from the focusing plane of the optical device and F denotes the point of intersection of this focusing plane with the optical axis.

O'X'Y'Z denotes the reference frame attached to the plane of the density gradient filter. The axis X' is at right angles to the plane of FIG. 2. The point O' is situated on the optical axis at a distance z' equal to FO' from the focusing plane. The points M of the filter situated in the plane O'X'Y' are designated by their cartesian coordinates (x', y').

$FX_1Y_1Z$ denotes the reference frame attached to the focusing plane of the optical device. The axis $X_1$ is at right angles to the plane of FIG. 2. The points I situated in the plane $FX_1Y_1$ are designated by their cartesian coordinates $(x_1, y_1)$. The matrix array of lenses is located in this plane.

Finally, O"X"Y"Z denotes the reference frame attached to the matrix of photodetectors. The axis X" is at right angles to the plane of FIG. 2. The images of the pupil formed by the lenses of the matrix array are situated in the plane O"X"Y". The point O" is situated on the optical axis at a distance z" from the plane $FX_1Y_1$. The points P" situated in this plane O"X"Y" are designated by their cartesian coordinates (x", y").

The density gradient filter is situated in the plane O'X'Y'. Its transmission T(x', y') is equal to the product of two sinusoidal functions turned by 45 degrees about the optical axis. More specifically, the transmission of the filter is equal to:

$$T(x', y') = \frac{1 + \sin\left(\sqrt{2}\,\pi(x' - y')/p_x\right)\sin\left(\sqrt{2}\,\pi(x', y')/p_y\right)}{2} \tag{10}$$

$p_x$ and $p_y$ represent the spatial periods of the two sinusoidal functions. These periods can be different. Hereinafter in the description, it is considered that these periods are identical and equal to p.

Figure 3:
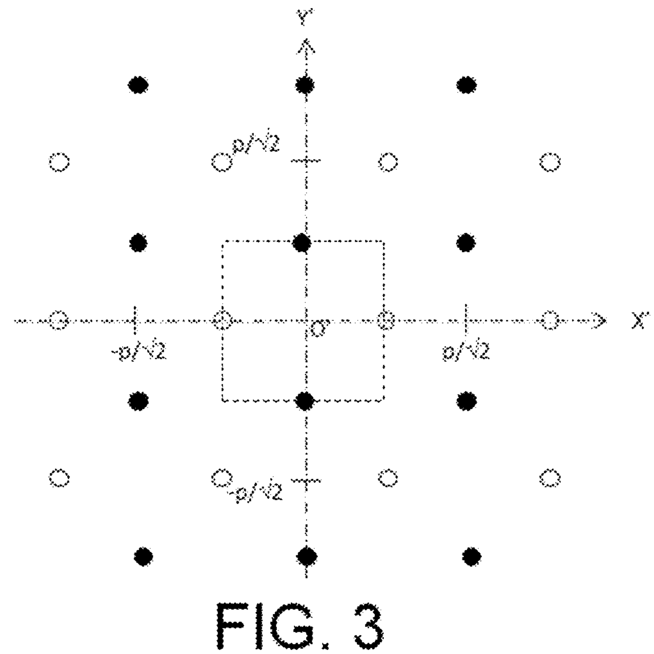
FIG. 3 represents the maxima and the minima of the density gradient filter according to the first embodiment of the invention.

The minima of the function T(x', y') are equal to 0 and the maxima are equal to 1. FIG. 3 represents the distribution of these minima and these maxima in the plane O'X'Y' of the density gradient filter in the case of periods that are identical on both axes. In this FIG. 3, the maxima are represented by white circles and the minima by black circles.

Figure 4:
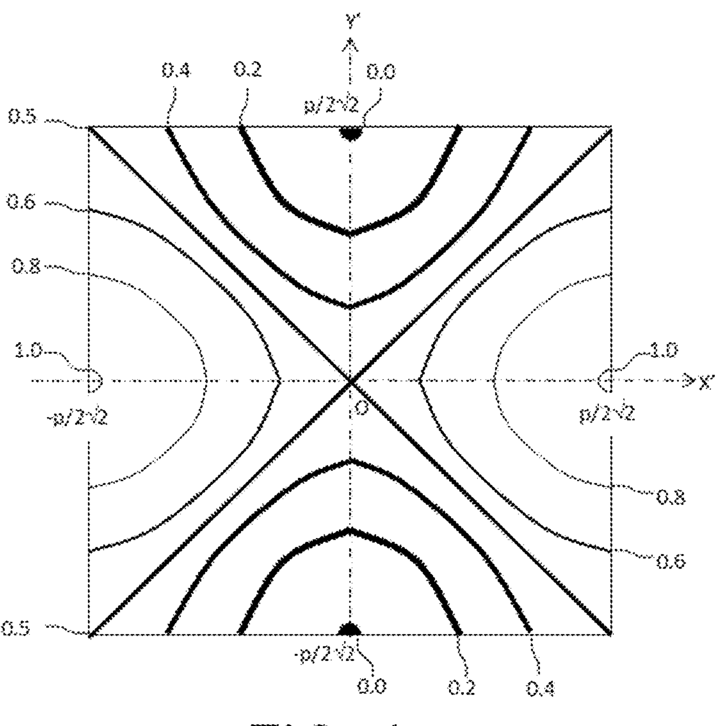
FIG. 4 represents the curves of levels of the central part of the filter according to the first embodiment of the invention.

FIG. 4 represents the transmission curves of same value in the plane O'X'Y' limited on both axes to the values lying between $-p/4\sqrt{2}$ and $+p/4\sqrt{2}$. The thicker lines correspond to the lowest transmission values.

The filter can also comprise an opaque mask comprising circular openings. The placement of each opening corresponds to that of a lens of the matrix array and its diameter is matched to the dimensions of this lens. More generally, the shape of the mask corresponds to that of the pupil of the lens.

This filter can be manufactured by means of various technologies which are, notably, optical or electronic lithography, nano-printing, recording of holographic plates or even by liquid crystal modulators.

The matrix array of mini-lenses 12 is situated in the plane $FX_1Y_1$. All the lenses of which it is composed are identical and of square section. The dimensions of the lenses lie between a few millimeters and a few centimeters. The tolerances on the design and the manufacture of these lenses must be such that they do not disturb the wave surface to be analyzed. That does not present any particular difficulties for the person skilled in the art, given the small aperture of these lenses.

The focal distance $f_L$ of the mini-lenses is adjusted so that each of them forms an image of the pupil in the plane O"X"Y" of the matrix of photodetectors.

This array comprises 4 k lenses, k being an integer greater than or equal to 1. The array can therefore comprise four lenses, eight lenses, twelve lenses and so on. The lenses are organized in groups of four disposed symmetrically around the optical axis. Each center of one of the four lenses of the group is disposed on an axis passing through the center O of the output pupil and a point O'M'(i, j) of the density gradient filter such that, in the plane referenced (x', y'), $$O'M'_{i,j} = \begin{bmatrix} i(m+0.25)p_x/\sqrt{2} \\ j(n+0.25)p_y/\sqrt{2} \end{bmatrix} \tag{11}$$

i and j being able to take the values −1 and +1, m and n being positive integers or nil.

The coordinates of the four centers $I_{i,j}$ of the lenses of each group in the plane $FX_1Y_1$ are deduced from the relationship:

$$OI_{i,j} = \frac{f}{f+z'}OM'_{i,j} \tag{12}$$

FIGS. 5, 6, 7 and 8 illustrate four examples of possible distributions of said lenses 12. They are represented in the plane $FX_1Y_1$. In these figures, the period p is the same on both axes. These figures also include the density gradient filter.

Figure 5:
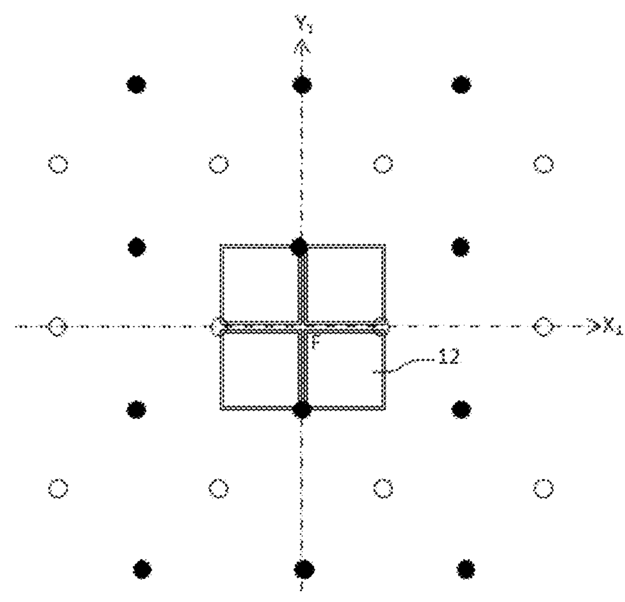
FIG. 5 represents a first distribution of the lenses of the matrix array according to the first embodiment of the invention.

In FIG. 5, the array comprises a single group of four lenses. In this example, the integers m and n are nil and the following applies:

$$O'M'_{i,j} = \begin{bmatrix} 0.25ip/\sqrt{2} \\ 0.25jp/\sqrt{2} \end{bmatrix} \tag{13}$$

This configuration is the simplest to produce inasmuch as it comprises a minimum of lenses and, in addition, they are glued to one another.

Figure 6:
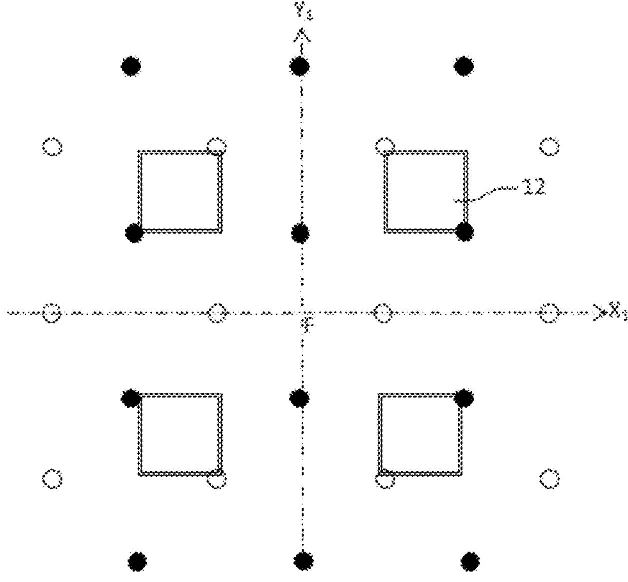
FIG. 6 represents a second distribution of the lenses of the matrix array according to the first embodiment of the invention.

In FIG. 6, the array also comprises a single group of four lenses. In this example, m and n are equal to 1 and the following applies:

$$O'M'_{i,j} = \begin{bmatrix} 1.25ip/\sqrt{2} \\ 1.25jp/\sqrt{2} \end{bmatrix} \tag{14}$$

Figure 7:
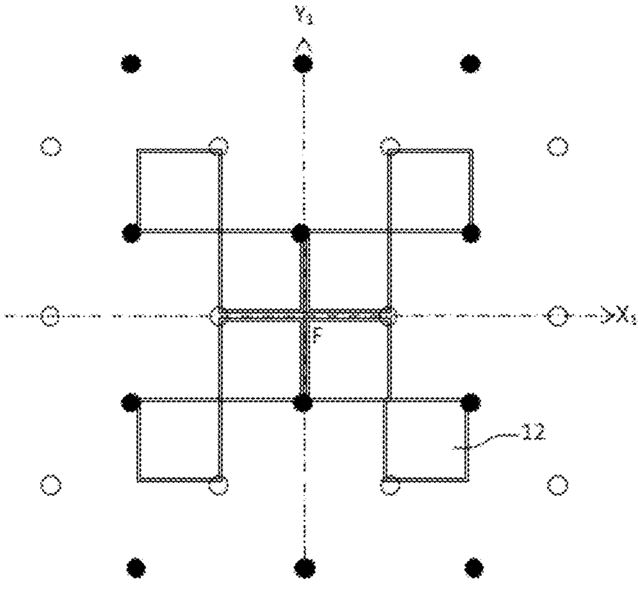
FIG. 7 represents a third distribution of the lenses of the matrix array according to the first embodiment of the invention.

In FIG. 7, the array comprises the two groups of four lenses of FIGS. 5 and 6.

Figure 8:
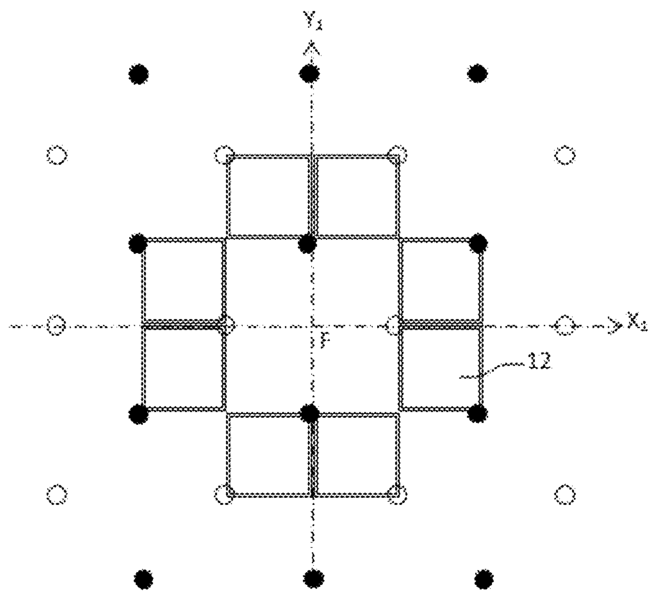
FIG. 8 represents a fourth distribution of the lenses of the matrix array according to the first embodiment of the invention.

In FIG. 8, the array comprises two groups of four lenses. The centers of the first and second groups verify:

$$O'M'_{i,j} = \begin{bmatrix} 0.25ip/\sqrt{2} \\ 1.25jp/\sqrt{2} \end{bmatrix} \text{ and } O'M'_{i,j} = \begin{bmatrix} 1.25ip/\sqrt{2} \\ 0.25jp/\sqrt{2} \end{bmatrix} \quad (15)$$

The matrix of photodetectors is disposed in the plane O"X"Y" in which is located the images of the pupil formed by the lenses of the matrix array. The sensitivity of the matrix of photodetectors is matched to the spectral band of the light object or of the light source to be inspected. This matrix comprises a number of detectors matched to the spatial resolution sought. As an example, a matrix of 2048×2048 pixels is sufficient to achieve a maximal spatial resolution of 1000×1000 on the wave surface.

In the above, the optical device is a lens, its focusing plane is situated in the plane of the matrix array of the lenses. When the optical device is an afocal, the optical measurement head comprises an additional optic disposed in the output pupil, such that the focusing plane of said additional optic is situated in the plane of the matrix array of the lenses.

It is also possible, regardless of the type of optical device to be measured, to add an optic with variable focal length making it possible to optimize the inspection by zooming in, for example, on a particular zone of the pupil.

The image processing computer performs the following functions. Its first function consists in memorizing the raw images received by the matrix of photodetectors. Its second function consists in calibrating these raw images so as to correct the errors of uniformity of the pixels of the matrix of photodetectors. This calibration is obtained from known images stored in a prior calibration phase.

The duly calibrated image is separated into as many secondary images as there are lenses in the matrix array. Each secondary image is the image of the pupil of the optical device given by a particular lens. These secondary images are recentered in the plane of the pupil. Each of the images has an intensity distribution denoted $I''_k(x, y)$, k being the index of the secondary image.

The analytical expressions of the intensity distributions of the images are obtained from a Fresnel diffraction-mode analysis. Information on this method will be found in the publication by F. Hénault, "Fresnel diffraction analysis of Ronchi and reverse Hartmann tests", submitted to J. Opt. Soc. Am. A.

As an example, for a configuration with four lenses as represented in FIG. 5, these distributions are as follows:

$$I''_1(x, y) = \frac{5}{16} - \frac{\cos\gamma}{4}\sin(\varphi'_X/\sqrt{2}) + \frac{\cos\gamma}{4}\sin(\varphi'_Y/\sqrt{2}) - \frac{1}{8}\sin(\varphi'_X/\sqrt{2})\sin(\varphi'_Y/\sqrt{2}) - \frac{1}{32}\cos(\sqrt{2}\,\varphi'_X) - \frac{1}{32}\cos(\sqrt{2}\,\varphi'_Y) \quad (16)$$

$$I''_2(x, y) = \frac{5}{16} + \frac{\cos\gamma}{4}\sin(\varphi'_X/\sqrt{2}) + \frac{\cos\gamma}{4}\sin(\varphi'_Y/\sqrt{2}) + \frac{1}{8}\sin(\varphi'_X/\sqrt{2})\sin(\varphi'_Y/\sqrt{2}) - \frac{1}{32}\cos(\sqrt{2}\,\varphi'_X) - \frac{1}{32}\cos(\sqrt{2}\,\varphi'_Y) \quad (17)$$

$$I''_3(x, y) = \frac{5}{16} - \frac{\cos\gamma}{4}\sin(\varphi'_X/\sqrt{2}) - \frac{\cos\gamma}{4}\sin(\varphi'_Y/\sqrt{2}) + \frac{1}{8}\sin(\varphi'_X/\sqrt{2})\sin(\varphi'_Y/\sqrt{2}) - \frac{1}{32}\cos(\sqrt{2}\,\varphi'_X) - \frac{1}{32}\cos(\sqrt{2}\,\varphi'_Y) \quad (18)$$

$$I''_4(x, y) = \frac{5}{16} + \frac{\cos\gamma}{4}\sin(\varphi'_X/\sqrt{2}) - \frac{\cos\gamma}{4}\sin(\varphi'_Y/\sqrt{2}) - \frac{1}{8}\sin(\varphi'_X/\sqrt{2})\sin(\varphi'_Y/\sqrt{2}) - \frac{1}{32}\cos(\sqrt{2}\,\varphi'_X) - \frac{1}{32}\cos(\sqrt{2}\,\varphi'_Y) \quad (19)$$

By using the preceding notations, the following applies:

$$\varphi'_x = \frac{2\pi(f+z')}{p}\frac{\partial\Delta}{\partial x}(x, y) + \frac{2\pi z'}{fp}x, \quad (20)$$

$$\varphi'_y = \frac{2\pi(f+z')}{p}\frac{\partial\Delta}{\partial y}(x, y) + \frac{2\pi z'}{fp}y \text{ and}$$

$$\gamma = 4\pi\lambda\frac{z'(f+z')}{fp^2} \quad (21)$$

$$\frac{\partial\Delta}{\partial x}(x, y) \text{ and } \frac{\partial\Delta}{\partial y}(x, y)$$

represent the derivatives of the wave surface at each point P of the pupil.

The adimensional parameter γ typically takes a very small value (generally of the order of $10^{-4}$).

From the secondary images, it is then possible to calculate these two derivatives of the wave surface. The following are obtained:

$$\frac{\partial\Delta}{\partial x}(x, y) = \frac{z'}{f(f+z')}x + \frac{p}{2\pi\sqrt{2}(f+z')}\sin^{-1}\left(\frac{I''_4(x, y) - I''_3(x, y) + I''_2(x, y) - I''_2(x, y)}{\cos\gamma}\right) \text{ and} \quad (22)$$

$$\frac{\partial\Delta}{\partial y}(x, y) = \frac{z'}{f(f+z')}y + \frac{p}{2\pi\sqrt{2}(f+z')}\sin^{-1}\left(\frac{I''_4(x, y) + I''_3(x, y) - I''_2(x, y) - I''_2(x, y)}{\cos\gamma}\right) \quad (23)$$

Finally, it is possible to reconstruct the wave surface Δ(x, y) from these two partial derivatives from their integration. Additional information on this point will be found in the publication by F. Roddier, C. Roddier, "Wavefront reconstruction using iterative Fourier transforms", Applied Optics vol. 30, p. 1325-1327 (1991).

The optimization of the spatial period of the density gradient filter must satisfy two conflicting constraints.

The equations giving the phase variations o'x and q'y show that the quantities to be measured $$\frac{\partial\Delta}{\partial x}(x, y) \text{ and } \frac{\partial\Delta}{\partial y}(x, y)$$

are amplified by a factor g that is called gain and which has the value: g=2ρ√2(f+z')/p.

The choice of a high gain makes it possible to maximize the intensity variations in the images acquired. The observance of this sensitivity criterion leads to the short spatial periods being favored so as to minimize the parameter p.

Moreover, the use of a filter constructed from periodic functions leads to an effect of replications of the image of the pupil of the optical device to be measured. This effect causes a relative decentering p of the secondary images. It is demonstrated that this parameter has the value:

$$\rho = \frac{\lambda(f+z')}{Dp},$$

D being the diameter of the pupil.

This parameter must be as low as possible, typically lower than 1%, which leads to the long spatial periods being favored.

It is possible to establish a trade-off between these two conflicting trends by means of a least squares criterion C which has the value:

$$C = \rho^2 + \frac{w^2}{g^2} = \frac{\lambda^2 (f+z')^2}{D^2 p^2} + \frac{w^2 p^2}{4\pi^2 (f+z')^2} \tag{24}$$

In that equation, w is a scale factor lying between $10^3$ and $10^4$. The minimum of the criterion is reached when the period $p_0$ has the value:

$$p_0 = (f+z')\sqrt{\frac{2\pi\lambda}{wD}} \tag{25}$$

This period $p_0$ can be refined by means of simulations.

As an example, for a telescope of 100 meter focal length, of 10 meter aperture and used in the visible with a wavelength centered on 0.5 micron, the optical head being disposed at the focus of this telescope, the spatial period of the filter is 1 millimeter.

The measurement accuracy obtained is of the order of a hundredth of the wavelength and the measurement time is less than a hundredth of a second. This time is short enough to overcome the disturbances generated by the environment such as the microvibrations and atmospheric turbulences.

According to an alternative embodiment of the invention, the density gradient filter can have an optical transmission T(x', y') which varies piecewise linearly, governed by the equation $$T_{ij}(x', y') = \frac{1 + \sqrt{2}\pi\left(idx'/p_x - jdy'/p_x\right)}{2} \text{ with} \tag{26}$$

$$\begin{bmatrix} dx' \\ dy' \end{bmatrix} = \begin{bmatrix} x' - i(m+0.25)p_x/\sqrt{2} \\ y' - j(m+0.25)p_y/\sqrt{2} \end{bmatrix} \tag{27}$$

The equation (26), (27) is obtained by development limited to the first order of the sinus functions of the equation (1) in the vicinity of the points $M'_{ij}$ defined by (2).

Figure 9:
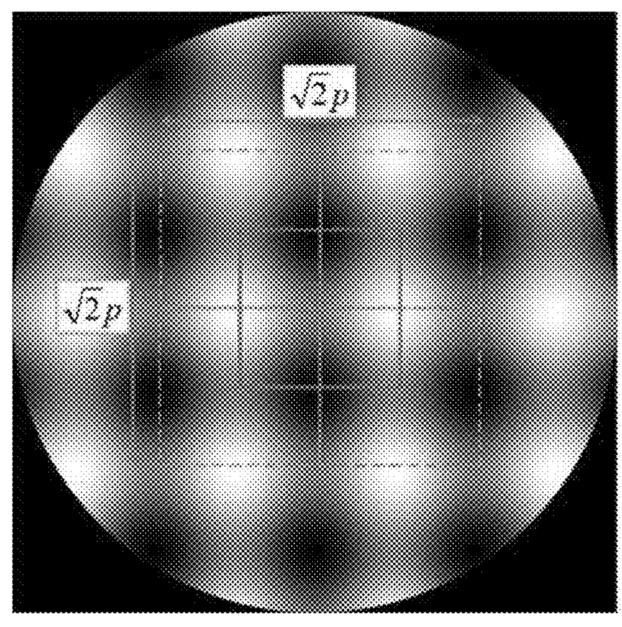
FIG. 9 represents a transmission mode map of the filter according to the first embodiment of the invention.
Figure 10:
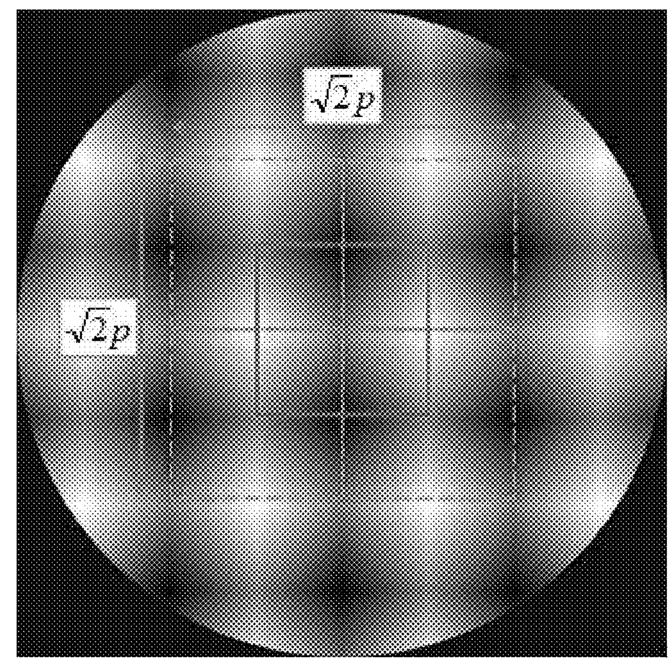
FIG. 10 represents a transmission mode map of the filter according to a second embodiment of the invention.

FIGS. 9 and 10 show, respectively, the transmission mode map of a filter defined by the equation (1)—called "crossed sine" filter—and by the equations (26), (27)—called "linear" filter—in the case where $p_x=p_y=p$.

The main advantage of this second embodiment is that the calculations needed to obtain the partial derivatives from the images obtained from said optical measurement head are simpler than in the case of the first embodiment. It is indeed possible to demonstrate that the following then applies:

$$\frac{\partial \Delta}{\partial x}(x, y) = Ax + B(I''_4(x, y) - I''_3(x, y) + I''_2(x, y) - I''_1(x, y)) \tag{28}$$

$$\frac{\partial \Delta}{\partial y}(x, y) = Ay + B(I''_4(x, y) + I''_3(x, y) - I''_2(x, y) - I''_1(x, y)) \tag{29}$$

A and B being constants dependent on the geometrical parameters of the optical measurement head.

For a configuration with four lenses as represented in FIG. 5, but with a filter defined by the equations (26), (27), the following in particular applies:

$$\frac{\partial \Delta}{\partial x}(x, y) = \frac{z'}{f(f+z')}x - \frac{p}{4\sqrt{2}(f+z')}(I''_4(x, y) - I''_3(x, y) + I''_2(x, y) - I''_1(x, y)) \tag{30}$$

$$\frac{\partial \Delta}{\partial y}(x, y) = \frac{z'}{f(f+z')}y - \frac{p}{4\sqrt{2}(f+z')}(I''_4(x, y) + I''_3(x, y) - I''_2(x, y) - I''_1(x, y)) \tag{31}$$

In which f and z' have been defined with reference to the first embodiment.

Digital simulations performed with the same computation codes as in the case of the "crossed sine" filter of the equation (1) have shown that the system for inspecting optical wave surfaces equipped with the "linear" filter of the equations (26) and (27) makes it possible to achieve equivalent measurement accuracies.

The invention claimed is:

1. A system for inspecting an optical wave surface output from an optical device, said optical device comprising an output pupil, said inspection system comprising an optical measurement head and a computer for processing images obtained from said optical measurement head, wherein the optical measurement head comprises:

a matrix array of linearly varying density gradient filters, in a plane referenced (x', y') at right angles to the optical axis of the optical measurement head, the transmission T(x', y') of said filters being governed by the equation:

$$T_{ij}(x', y') = \frac{1 + \sqrt{2}\pi\left(idx'/p_x - jdy'/p_x\right)}{2} \text{ with}$$

$$\begin{bmatrix} dx' \\ dy' \end{bmatrix} = \begin{bmatrix} x' - i(m+0.25)p_x/\sqrt{2} \\ y' - j(n+0.25)p_y/\sqrt{2} \end{bmatrix}$$

$p_x$ and $p_y$ representing the periods of the two sinusoidal functions dependent respectively on dx' and dy', i and j being able to take the values −1 and +1, m and n being positive integers or nil, a matrix array of identical lenses, of square form, of the same focal length, said matrix array comprising 4 k lenses, where k is an integer greater than or equal to 1, each center of one of the four lenses of a group of four lenses being disposed on a respective axis passing through the center of the output pupil and one of four points O'M'(i, j) of the matrix array of density gradient filters such that, in the plane referenced (x', y'), the four points are defined by O'M'(i, j) based on the combinations i=1, j=1; i=−1, j=1; i=1, j=−1; and i=−1, j=−1 via the following relation:

$$O'M'_{i,j} = \begin{bmatrix} i(m+0.25)p_x/\sqrt{2} \\ j(n+0.25)p_y/\sqrt{2} \end{bmatrix}$$

a matrix of photodetectors, each of the four lenses of a group of four lenses forming, of the pupil, an image in the plane of this matrix, these images being referenced $I''_k(x, y)$, k varying from 1 to 4;

the computer for processing the images comprises computation means that make it possible to calculate the partial derivatives $$\frac{\partial\Delta}{\partial x}(x, y) \text{ and } \frac{\partial\Delta}{\partial y}(x, y)$$

of the wave surface $\Delta(x, y)$ in the plane (x, y) of the output pupil, these partial derivatives being equal to $$\frac{\partial\Delta}{\partial x}(x, y) = Ax + B(I_4''(x, y) - I_3''(x, y) + I_2''(x, y) - I_1''(x, y))$$

$$\frac{\partial\Delta}{\partial y}(x, y) = Ay + B(I_4''(x, y) + I_3''(x, y) - I_2''(x, y) - I_1''(x, y))$$

A and B being constants dependent on the geometrical parameters of the optical measurement head.

2. The inspection system as claimed in claim 1, wherein, when the optical device is a lens, its focusing plane being situated in the plane of the matrix array of the lenses.

3. The inspection system as claimed in claim 1, wherein, when the optical device is an afocal, the optical measurement head comprises an additional optic disposed in the output pupil, such that the focusing plane of said additional optic is situated in the plane of the matrix array of the lenses.

4. The inspection system as claimed in claim 1, wherein the matrix array comprises at least one second quadruplet of lenses.

5. The inspection system as claimed in claim 1, wherein the two periods $p_x$ and $p_y$ are equal.

* * * * *